US012700546B2

(12) United States Patent
Saita

(10) Patent No.: US 12,700,546 B2
(45) Date of Patent: Aug. 4, 2026

(54) THIN FILM CAPACITOR WITH TERMINAL ELECTRODE HAVING OVERLAPPING AND NON-OVERLAPPING SECTIONS

(71) Applicant: TDK Corporation, Tokyo (JP)

(72) Inventor: Hitoshi Saita, Tokyo (JP)

(73) Assignee: TDK Corporation, Tokyo (JP)

( * ) Notice: Subject to any disclaimer, the term of this patent is extended or adjusted under 35 U.S.C. 154(b) by 49 days.

(21) Appl. No.: 18/708,472

(22) PCT Filed: Oct. 12, 2022

(86) PCT No.: PCT/JP2022/037962
§ 371 (c)(1),
(2) Date: May 8, 2024

(87) PCT Pub. No.: WO2023/095472
PCT Pub. Date: Jun. 1, 2023

(65) Prior Publication Data
US 2025/0029791 A1     Jan. 23, 2025

Related U.S. Application Data

(60) Provisional application No. 63/283,183, filed on Nov. 24, 2021.

(51) Int. Cl.
*H01G 4/33* (2006.01)
*H01G 4/228* (2006.01)
*H01G 4/38* (2006.01)

(52) U.S. Cl.
CPC .............. *H01G 4/33* (2013.01); *H01G 4/228* (2013.01); *H01G 4/38* (2013.01)

(58) Field of Classification Search
None
See application file for complete search history.

(56) References Cited

U.S. PATENT DOCUMENTS

| 4,424,615 A | 1/1984 | Wakino |
| 2009/0166074 A1* | 7/2009 | Furuya .................. H01G 4/228 |
| | | 174/260 |

(Continued)

FOREIGN PATENT DOCUMENTS

| JP | S56-140614 A | 11/1981 |
| JP | S57-146325 U1 | 9/1982 |

(Continued)

OTHER PUBLICATIONS

Translation JP S57-146325U (no date).*

(Continued)

*Primary Examiner* — Eric W Thomas
(74) *Attorney, Agent, or Firm* — Rimon P.C.

(57) ABSTRACT
A thin film capacitor includes a dielectric layer, capacitor electrodes formed respectively on first and second surfaces of the dielectric layer, a protective insulating film formed on the first surface of the dielectric layer so as to embed therein one of the capacitor electrodes, a protective insulating film formed on the second surface of the dielectric layer so as to embed therein another of the capacitor electrodes, and terminal electrodes connected respectively to the capacitor electrodes. One of the terminal electrodes includes a first section positioned on the protective insulating film so as to overlap the other of the capacitor electrodes, a second section positioned on the protective insulating film so as not to overlap the other of the capacitor electrodes, and a third section connecting the first and second sections.

19 Claims, 7 Drawing Sheets

(56)     References Cited

U.S. PATENT DOCUMENTS

| | | | |
|---|---|---|---|
| 2009/0231820 | A1 | 9/2009 | Tanaka |
| 2011/0002082 | A1 | 1/2011 | Bultitude et al. |
| 2011/0298578 | A1* | 12/2011 | Feichtinger ............ H01C 7/112 |
| | | | 338/20 |
| 2014/0002952 | A1 | 1/2014 | Mcconnell et al. |
| 2019/0027309 | A1* | 1/2019 | Lee ........................ H01G 4/005 |
| 2019/0392992 | A1 | 12/2019 | Kumagae et al. |

FOREIGN PATENT DOCUMENTS

| | | | |
|---|---|---|---|
| JP | 2985344 | B2 * | 11/1999 |
| JP | 2009-224786 | A | 10/2009 |
| JP | 2012-532455 | A | 12/2012 |
| JP | 2014-183104 | A | 9/2014 |
| JP | 2016-502273 | A | 1/2016 |
| JP | 2020-004953 | A | 1/2020 |

OTHER PUBLICATIONS

International Search Report received in PCT Application No. PCT/JP2022/037962, dated Dec. 20, 2022.
Office Action dated Jun. 2, 2026, issued in corresponding Japanese Application No. 2023-563548.

* cited by examiner

THIN FILM CAPACITOR WITH TERMINAL ELECTRODE HAVING OVERLAPPING AND NON-OVERLAPPING SECTIONS

CROSS-REFERENCE TO RELATED APPLICATIONS

This application is the U.S. National Phase under 35 U.S.C. § 371 of International Application No. PCT/JP2022/037962, filed on Oct. 12, 2022, which claims the benefit of U.S. Provisional Application No. 63/283,183 filed on Nov. 24, 2021, the entire contents of each of which are hereby incorporated by reference.

TECHNICAL FIELD

The present invention relates to a thin film capacitor.

BACKGROUND ART

Patent Document 1 discloses an electronic component having a structure in which capacitor electrodes and dielectric layers are alternately stacked. Odd-numbered capacitor electrodes are connected in common to a first terminal electrode, and even-numbered capacitor electrodes are connected in common to a second terminal electrode.

CITATION LIST

Patent Document

[Patent Document 1] JP 2014-183104A

Disclosure of the Invention

Problem to be Solved by the Invention

However, in the electronic component described in Patent Document 1, one of the odd-numbered capacitor electrodes that is positioned at one end portion overlap the second terminal electrode, and one of the even-numbered capacitor electrodes that is positioned at one end portion overlap the first terminal electrode, so that a dielectric withstand voltage may be insufficient at these portions.

An object of the present invention is therefore to provide a thin film capacitor having an improved dielectric withstand voltage.

Means for Solving the Problem

A thin film capacitor according to one aspect of the present invention includes: a dielectric layer having a first surface and a second surface positioned on the opposite side of the first surface; a first capacitor electrode formed on the first surface of the dielectric layer; a second capacitor electrode formed on the second surface of the dielectric layer; a first protective insulating film formed on the first surface of the dielectric layer so as to embed therein the first capacitor electrode; a second protective insulating film formed on the second surface of the dielectric layer so as to embed therein the second capacitor electrode; a first terminal electrode electrically connected to the first capacitor electrode; and a second terminal electrode electrically connected to the second capacitor electrode. The first terminal electrode includes a first section positioned on the first protective insulating film so as to overlap the first capacitor electrode, a second section positioned on the second protective insulating film so as not to overlap the second capacitor electrode, and a third section connecting the first and second sections.

According to the present invention, a dielectric withstand voltage between the first terminal electrode and second capacitor electrode is improved.

In the present invention, the first capacitor electrode may be exposed from a first side surface of a stacked body including the dielectric layer, first and second capacitor electrodes, and first and second protective insulating films, and the third section may be positioned on the first side surface. This facilitates connection between the first terminal electrode and first capacitor electrode.

In the present invention, the second terminal electrode may include a fourth section positioned on the first protective insulating film so as not to overlap the first capacitor electrode, a fifth section positioned on the second protective insulating film so as to overlap the second capacitor electrode, and a sixth section connecting the fourth and fifth sections. This improves a dielectric withstand voltage between the second terminal electrode and first capacitor electrode.

In the present invention, the second capacitor electrode may be exposed from a second side surface of the stacked body, and the sixth section may be positioned on the second side surface. This facilitates connection between the second terminal electrode and second capacitor electrode.

A thin film capacitor according to another aspect of the present invention includes first and second unit capacitors, the first and second unit capacitors each including: a dielectric layer having a first surface and a second surface positioned on the opposite side of the first surface; a first capacitor electrode formed on the first surface of the dielectric layer; a second capacitor electrode formed on the second surface of the dielectric layer; a first protective insulating film formed on the first surface of the dielectric layer so as to embed therein the first capacitor electrode; a second protective insulating film formed on the second surface of the dielectric layer so as to embed therein the second capacitor electrode; a first terminal electrode electrically connected to the first capacitor electrode; and a second terminal electrode electrically connected to the second capacitor electrode. The first terminal electrode includes a first section positioned on the first protective insulating film so as to overlap the first capacitor electrode, a second section positioned on the second protective insulating film so as not to overlap the second capacitor electrode, and a third section connecting the first and second sections. The first and second unit capacitors are stacked such that the first section of the first terminal electrode included in the first unit capacitor and the first section of the first terminal electrode included in the second unit capacitor are connected to each other.

According to the present invention, in a stacked structure of the first and second unit capacitors which are connected in parallel to each other, a dielectric withstand voltage between the first terminal electrode and second capacitor electrode can be improved.

In the present invention, the second terminal electrode may include a fourth section positioned on the first protective insulating film so as not to overlap the first capacitor electrode, a fifth section positioned on the second protective insulating film so as to overlap the second capacitor electrode, and a sixth section connecting the fourth and fifth sections, and the first and second unit capacitors may be stacked such that the fourth section of the second terminal electrode included in the first capacitor electrode and the fourth section of the second terminal electrode included in the second capacitor electrode are connected to each other.

This can improve a dielectric withstand voltage between the second terminal electrode and first capacitor electrode in the stacked structure of the parallel-connected first and second unit capacitors.

The thin film capacitor according to the present invention may further include a third unit capacitor having the same configuration as those of the first and second unit capacitors, and the first, second, and third unit capacitors may be stacked such that the second section of the first terminal electrode included in the second unit capacitor and the second section of the first terminal electrode included in the third unit capacitor are connected to each other and that the fifth section of the second terminal electrode included in the second unit capacitor and the fifth section of the second terminal electrode included in the third unit capacitor are connected to each other.

Thus, in a stacked structure of the first, second, and third unit capacitors which are connected in parallel to one another, a dielectric withstand voltage between the first terminal electrode and second capacitor electrode can be improved, and a dielectric withstand voltage between the second terminal electrode and first capacitor electrode can be improved.

Advantageous Effects of the Invention

As described above, according to the present invention, there can be provided a thin film capacitor having an improved dielectric withstand voltage.

MODE FOR CARRYING OUT THE INVENTION

Hereinafter, preferred embodiments of the present invention will be described in detail with reference to the accompanying drawings.

Figure 1:
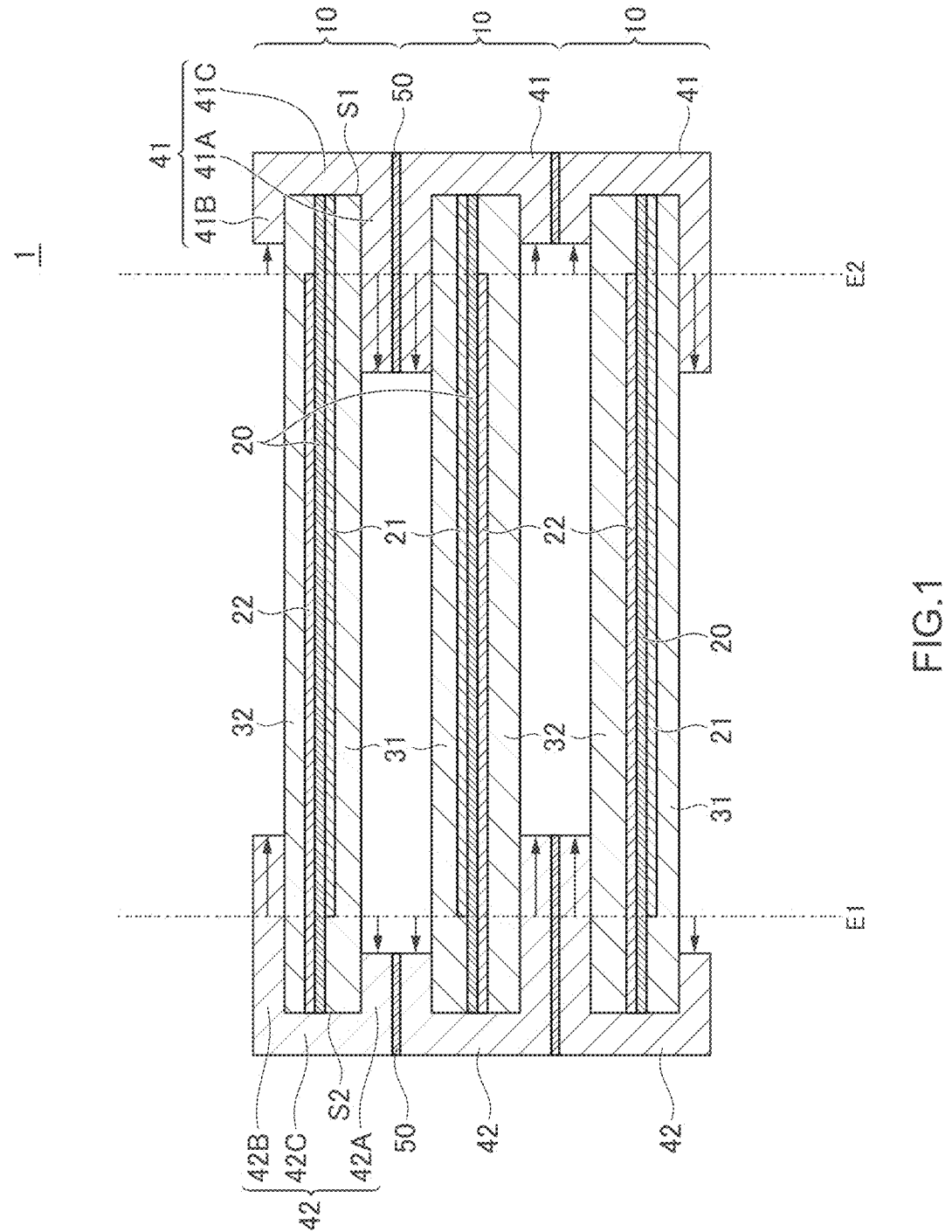
FIG. 1 is a schematic cross-sectional view for explaining the structure of a thin film capacitor 1 according to a first embodiment of the present invention.

FIG. 1 is a schematic cross-sectional view for explaining the structure of a thin film capacitor 1 according to a first embodiment of the present invention.

As illustrated in FIG. 1, the thin film capacitor 1 according to the first embodiment of the present invention has a structure in which a plurality of unit capacitors 10 are stacked. Although the thin film capacitor 1 illustrated in FIG. 1 has a structure in which three unit capacitors 10 are stacked, the number of the unit capacitors 10 to be stacked is not particularly limited.

The unit capacitor 10 has a dielectric layer 20, a capacitor electrode 21 formed on one surface of the dielectric layer 20, and a capacitor electrode 22 formed on the other surface of the dielectric layer 20. The capacitor electrodes 21 and 22 overlap each other through the dielectric layer 20, whereby a predetermined capacitance can be obtained.

The dielectric layer 20 is made of a perovskite dielectric material. Examples of the perovskite dielectric material include a ferroelectric material or a paraelectric material having a perovskite structure, such as $BaTiO_3$ (barium titanate), $(Ba_{1-x}Sr_x) TiO_3$ (barium strontium titanate), $(Ba_{1-x}Ca_x) TiO_3$, $PbTiO_3$, $Pb(Zr_xTi_{1-x}) O_3$, $(Sr_{1-x}Ca_x)$, $(Ti_{1-y}Zr_y)$, $Ba(Mg_{1/3}Ta_{2/3})$, a composite perovskite relaxer type ferroelectric material represented by $Pb(Mg_{1/3}Nb_{2/3}) O_3$, and the like, a bismuth layer compound represented by $Bi_4Ti_3O_{12}$, a tungsten bronze type ferroelectric material represented by $(Sr_{1-x}Ba_x) Nb_2O_6$ and $PbNb_2O_6$. Here, in the above-described perovskite structure, perovskite relaxer type ferroelectric material, bismuth layer compound, and tungsten bronze type ferroelectric material, the ratio of A site and B site is usually an integer ratio but may be purposefully shifted from the integer ratio in order to improve characteristics. In order to control the characteristics of the dielectric layer 20, the dielectric layer 20 may appropriately contain an additive substance as a subcomponent. The relative permittivity ($\varepsilon_r$) is 10 or more, for example. The larger the relative permittivity of the dielectric layer 20, the better, and there is not particular restriction on the upper limit value thereof. Further, the larger the dielectric withstand voltage of the dielectric layer 20, the better, and there is not particular restriction on the upper limit value thereof. The thickness of the dielectric layer 20 is about 10 nm to about 6000 nm, for example.

The capacitor electrode 21 is made of high-melting point metal such as nickel (Ni) and functions also as a support for increasing mechanical strength of the unit capacitor 10. One surface of the dielectric layer 20 has an area covered with the capacitor electrode 21 and an area not covered therewith. The capacitor electrode 21 is covered with a protective insulating film 31 made of resin or the like. The capacitor electrode 22 is made of a low-resistance metal such as copper (Cu). The other surface of the dielectric layer 20 has an area covered with the capacitor electrode 22 and an area not covered therewith. The capacitor electrode 22 is covered with a protective insulating film 32 made of resin or the like.

Figure 2A:
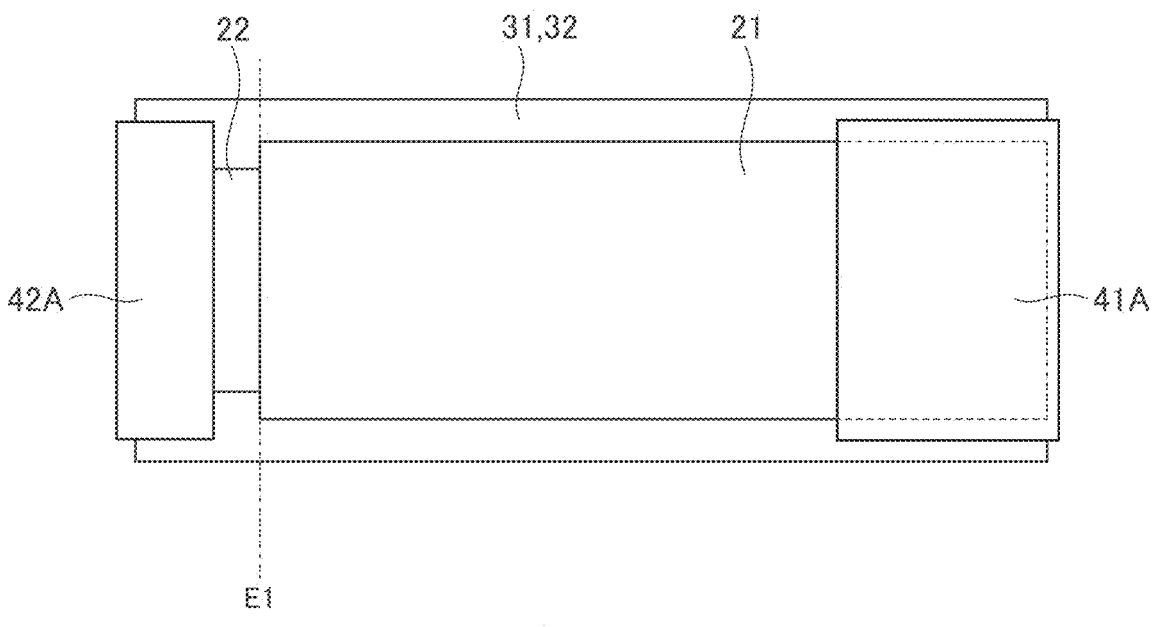
FIG. 2A is a schematic view illustrating the planar positional relation between the capacitor electrodes 21, 22 and terminal electrodes 41, 42 as viewed from the protective insulating film 31 side.
Figure 2B:
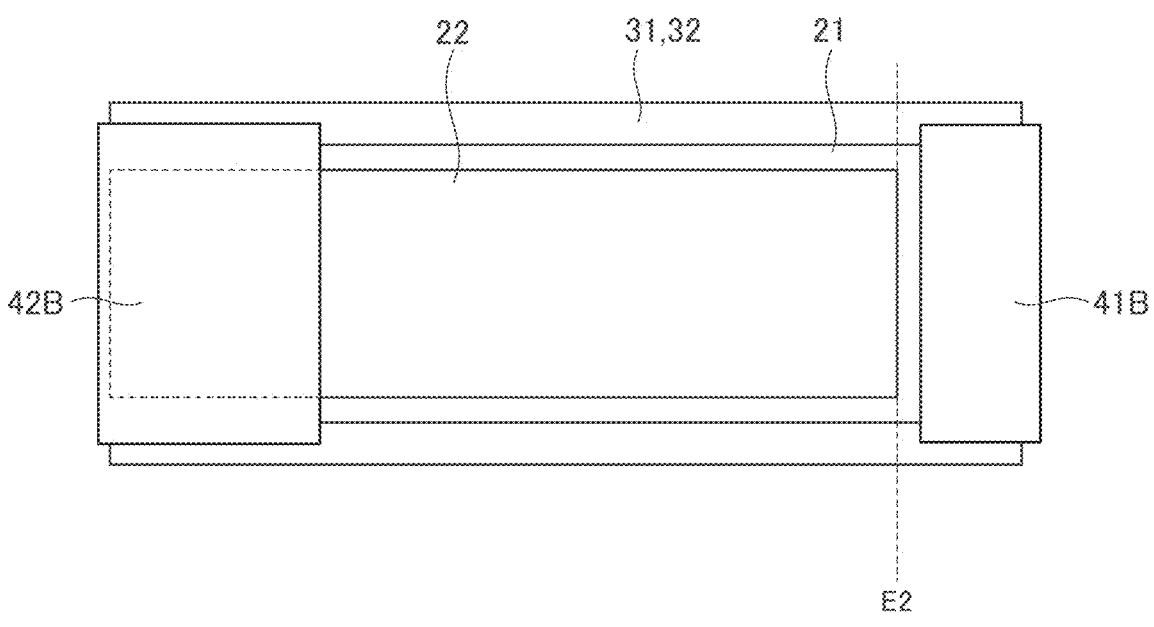
FIG. 2B is a schematic view illustrating the planar positional relation between the capacitor electrodes 21, 22 and terminal electrodes 41, 42 as viewed from the protective insulating film 32 side.

As illustrated in FIG. 1, the capacitor electrode 21 is connected to a terminal electrode 41, and the capacitor electrode 22 is connected to a terminal electrode 42. The terminal electrodes 41 and 42 are each made of low-resistance metal such as copper (Cu). The surface of each of the terminal electrodes 41 and 42 may be covered with a plating layer such as a gold (Au) playing layer. FIG. 2A is a schematic view illustrating the planar positional relation between the capacitor electrodes 21, 22 and terminal electrodes 41, 42 as viewed from the protective insulating film 31 side. FIG. 2B is a schematic view illustrating the planar positional relation between the capacitor electrodes 21, 22 and terminal electrodes 41, 42 as viewed from the protective insulating film 32 side.

The terminal electrode 41 has a first section 41A positioned on the protective insulating film 31, a second section 41B positioned on the protective insulating film 32, and a third section 41C positioned on a side surface S1 of the stacked body and connecting the first and second sections 41A and 41B. The third section 41C contacts the capacitor electrode 21 exposed to the side surface S1 of the stacked body. The terminal electrode 42 has a fourth section 42A positioned on the protective insulating film 31, a fifth section 42B positioned on the protective insulating film 32, and a sixth section 42C positioned on a side surface S2 of the stacked body and connecting the fourth and fifth sections 42A and 42B. The sixth section 42C contacts the capacitor electrode 22 exposed to the side surface S2 of the stacked body.

As viewed in the stacking direction, the first section 41A of the terminal electrode 41 overlaps the capacitor electrode 21, while the second section 41B of the terminal electrode 41 does not overlap the capacitor electrode 22. That is, the edge of the second section 41B of the terminal electrode 41 is positioned outside an edge E2 of the capacitor electrode 22. This ensures a dielectric withstand voltage between the capacitor electrode 22 and terminal electrode 41 and prevents occurrence of unnecessary parasitic capacitance. On the other hand, the first section 41A of the terminal electrode 41 overlaps the edge E2 of the capacitor electrode 22 as viewed in the stacking direction. That is, the first section 41A of the terminal electrode 41 overlaps both a part of the other surface of the dielectric layer 20 that is not covered with the capacitor electrode 22 and the capacitor electrode 22. This relaxes stress concentrated on the edge E2 of the capacitor electrode 22, thereby increasing product reliability.

As viewed in the stacking direction, the fifth section 42B of the terminal electrode 42 overlaps the capacitor electrode 22, while the fourth section 42A of the terminal electrode 42 does not overlap the capacitor electrode 21. That is, the edge of the fourth section 42A of the terminal electrode 42 is positioned outside an edge E1 of the capacitor electrode 21. This ensures a dielectric withstand voltage between the capacitor electrode 21 and terminal electrode 42 and prevents occurrence of unnecessary parasitic capacitance. On the other hand, the fifth section 42B of the terminal electrode 42 overlaps the edge E1 of the capacitor electrode 21 as viewed in the stacking direction. That is, the fifth section 42B of the terminal electrode 42 overlaps both a part of the one surface of the dielectric layer 20 that is not covered with the capacitor electrode 21 and the capacitor electrode 21. This relaxes stress concentrated on the edge E1 of the capacitor electrode 21, thereby increasing product reliability.

The unit capacitors 10 each having the above configuration are stacked such that the protective insulating films 31 or protective insulating films 32 of the vertically adjacent unit capacitors 10 face each other, where the first sections 41A of the terminal electrode 41 are connected to each other, the second sections 41B of the terminal electrode 41 are connected to each other, the fourth sections 42A of the terminal electrode 42 are connected to each other, and fifth sections 42B of the terminal electrode 42 are connected to each other. The above connections are each made through a solder 50 or the like.

Figure 3:
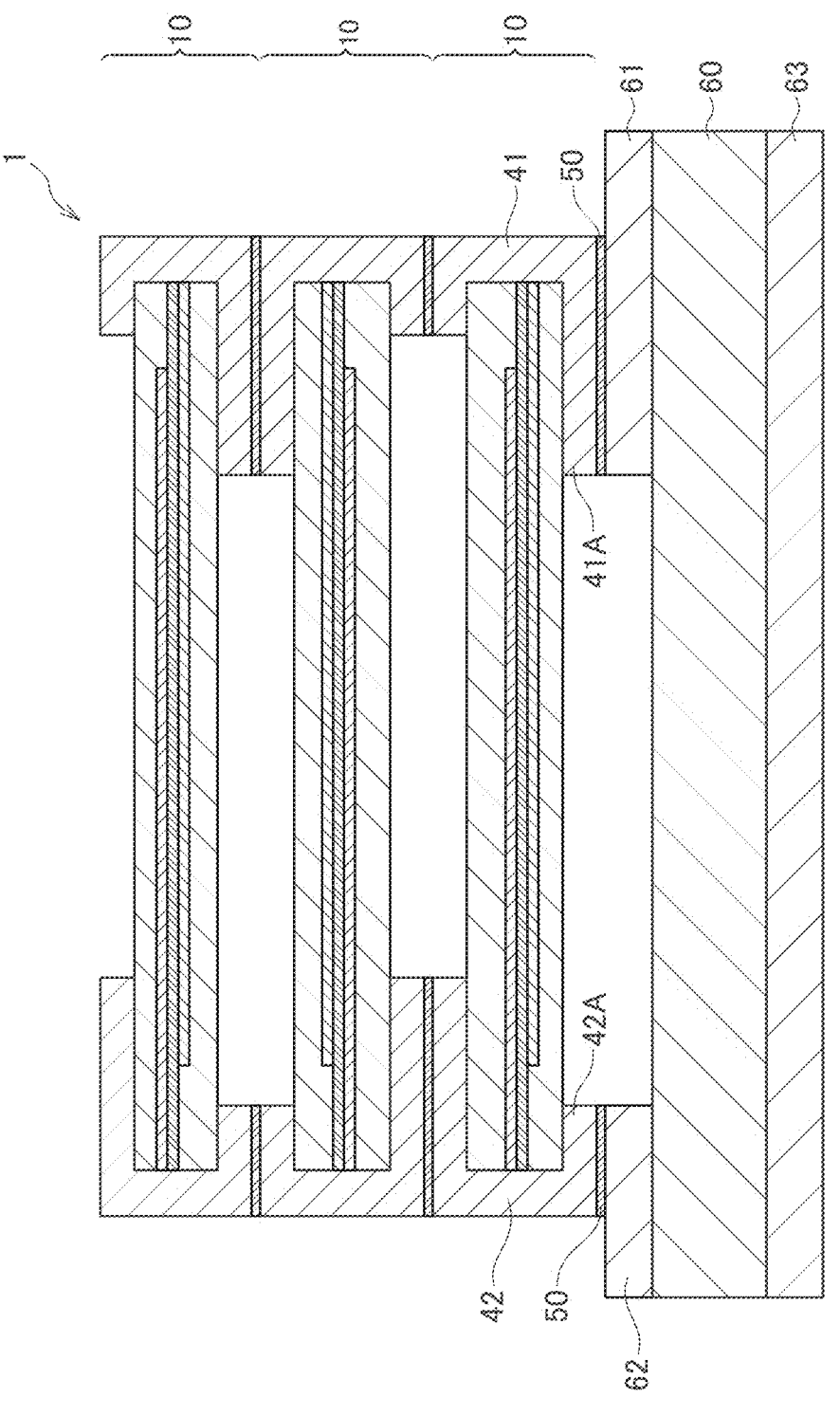
FIG. 3 is a schematic cross-sectional view illustrating a state where the thin film capacitor 1 is mounted on a DBC substrate.

FIG. 3 is a schematic cross-sectional view illustrating a state where the thin film capacitor 1 is mounted on a DBC (Direct Bonded Copper) substrate.

The DBC substrate includes a substrate 60 made of an insulating material having a high heat conductivity, such as $Al_2O_3$, AlN, or $Si_3N_4$ and copper patterns 61 to 63 formed on the surface of the substrate 60. In the example illustrated in FIG. 3, the copper patterns 61 and 62 are formed on one surface of the substrate 60, and the copper pattern 63 is on the other surface of the substrate 60. The first section 41A of the terminal electrode 41 of the lowermost one of the plurality of unit capacitors 10 constituting the thin film capacitor 1 is connected to the copper pattern 61 through the solder 50. The fourth section 42A of the terminal electrode 42 of the lowermost one of the plurality of unit capacitors 10 constituting the thin film capacitor 1 is connected to the copper pattern 62 through the solder 50. Thus, the copper pattern 61 is connected in common to the capacitor electrodes 21 included in the plurality of unit capacitors 10, and the copper pattern 62 is connected in common to the capacitor electrodes 22 included in the plurality of unit capacitors 10, with the result that the plurality of unit capacitors 10 are connected in parallel between the copper patterns 61 and 62. The capacitance of the thin film capacitor 1 can be adjusted by the number of the unit capacitors 10 to be stacked.

Figure 4:
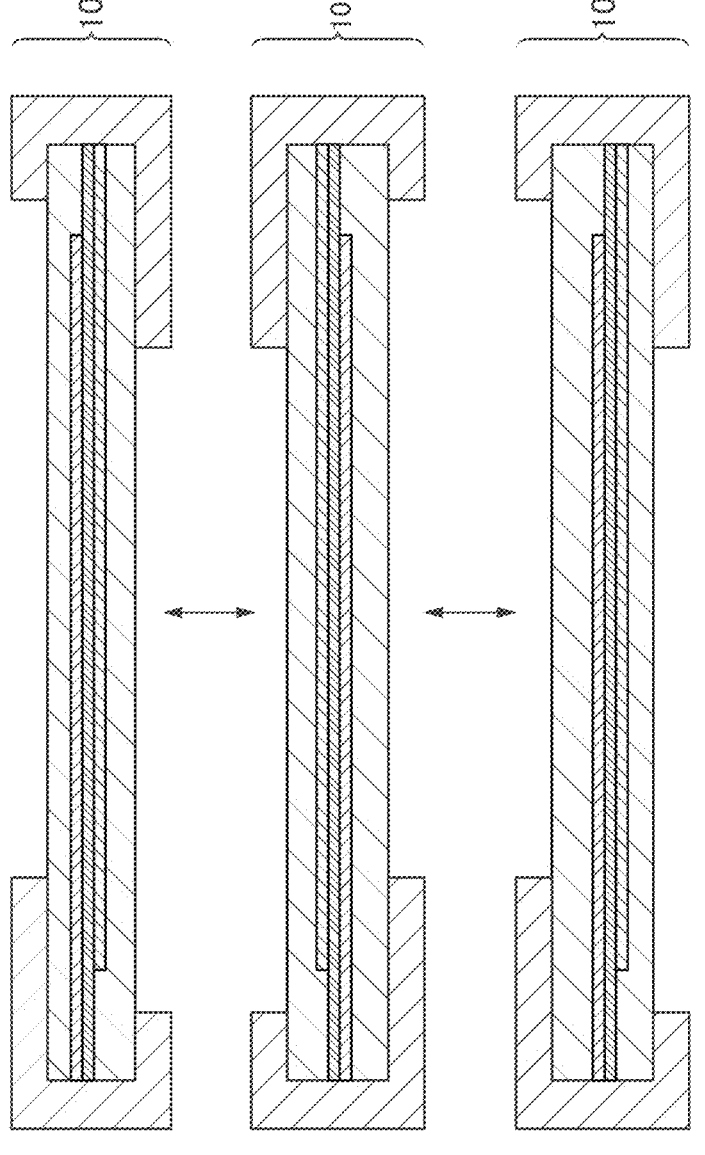
FIG. 4 is a schematic diagram for explaining a method of manufacturing the thin film capacitor 1.

The thin film capacitor 1 is manufactured as follows: a plurality of the unit capacitors 10 are taken from an aggregate substrate, followed by inspection, and unit capacitors 10 determined to be non-defectives are stacked as illustrated in FIG. 4. This allows achievement of a high manufacturing yield.

Figure 5:
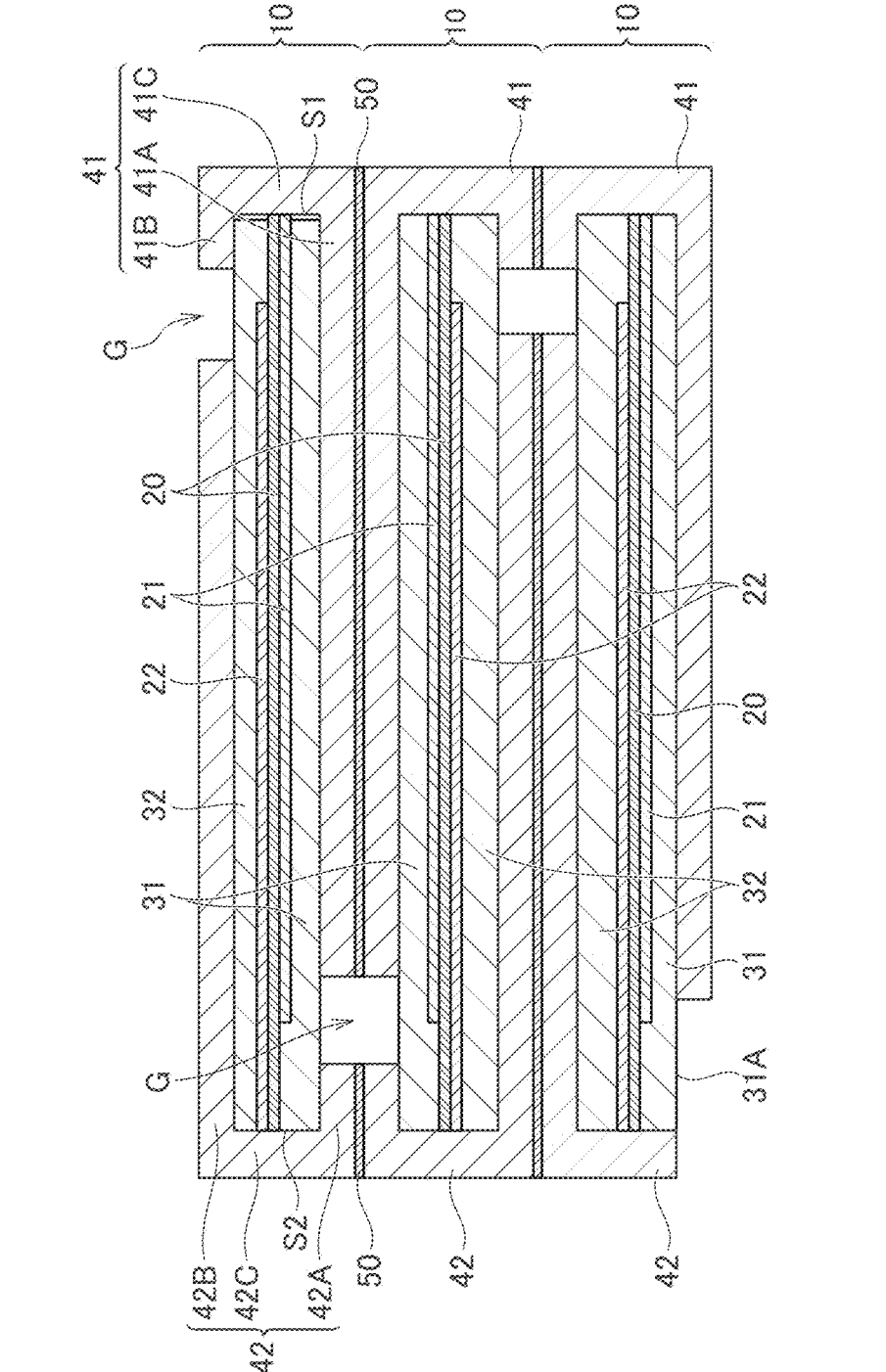
FIG. 5 is a schematic cross-sectional view for explaining the structure of a thin film capacitor 2 according to a second embodiment of the present invention.
Figure 6A:
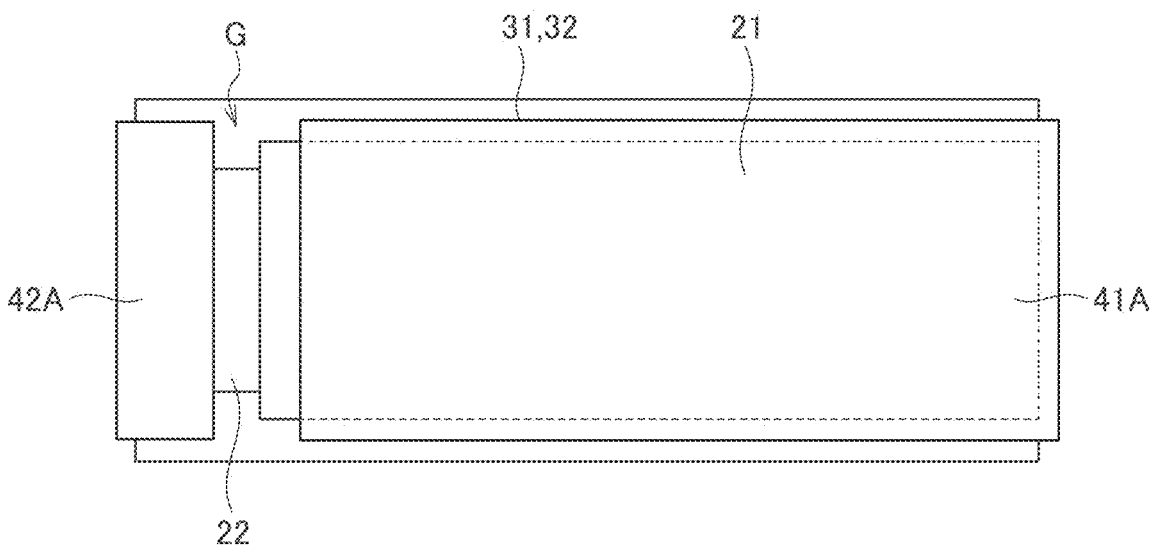
FIG. 6A is a schematic view illustrating the planar positional relation between the capacitor electrodes 21, 22 and terminal electrodes 41, 42 as viewed from the protective insulating film 31 side in the second embodiment.
Figure 6B:
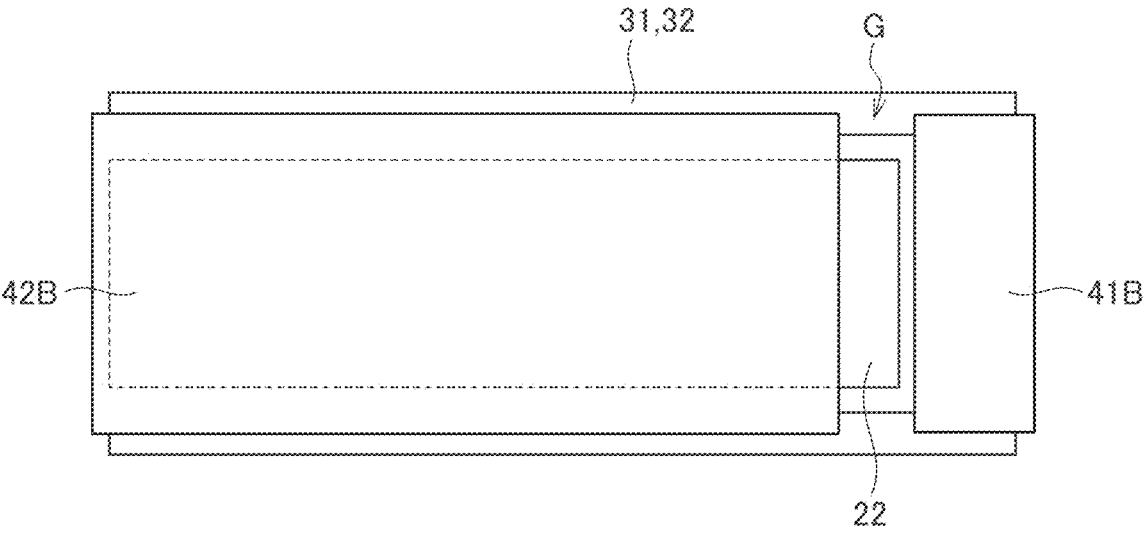
FIG. 6B is a schematic view illustrating the planar positional relation between the capacitor electrodes 21, 22 and terminal electrodes 41, 42 as viewed from the protective insulating film 32 side in the second embodiment.

FIG. 5 is a schematic cross-sectional view for explaining the structure of a thin film capacitor 2 according to a second embodiment of the present invention. FIG. 6A is a schematic view illustrating the planar positional relation between the capacitor electrodes 21, 22 and terminal electrodes 41, 42 as viewed from the protective insulating film 31 side in the second embodiment. FIG. 6B is a schematic view illustrating the planar positional relation between the capacitor electrodes 21, 22 and terminal electrodes 41, 42 as viewed from the protective insulating film 32 side in the second embodiment.

As illustrated in FIGS. 5, 6A, and 6B, the thin film capacitor 2 according to the second embodiment differs from the thin film capacitor 1 according to the first embodiment in that the first section 41A of the terminal electrode 41 covers most of the capacitor electrode 21 and that the fifth section 42B of the terminal electrode 42 covers most of the capacitor electrode 22. Other basic configurations are the same as those of the thin film capacitor 1 according to the first embodiment, so the same reference numerals are given to the same elements, and overlapping description will be omitted.

The first section 41A of the terminal electrode 41 and the fourth section 42A of the terminal electrode 42 form a gap G on the protective insulating film 31. The second section 41B of the terminal electrode 41 and the fifth section 42B of the terminal electrode 42 form a gap G on the protective insulating film 32. Further, in the lowermost unit capacitor 10, the fourth section 42A of the terminal electrode 42 is removed. Accordingly, in the lowermost unit capacitor 10, an upper surface 31A of the protective insulating film 31 is exposed without being covered with the terminal electrode 42.

Figure 7:
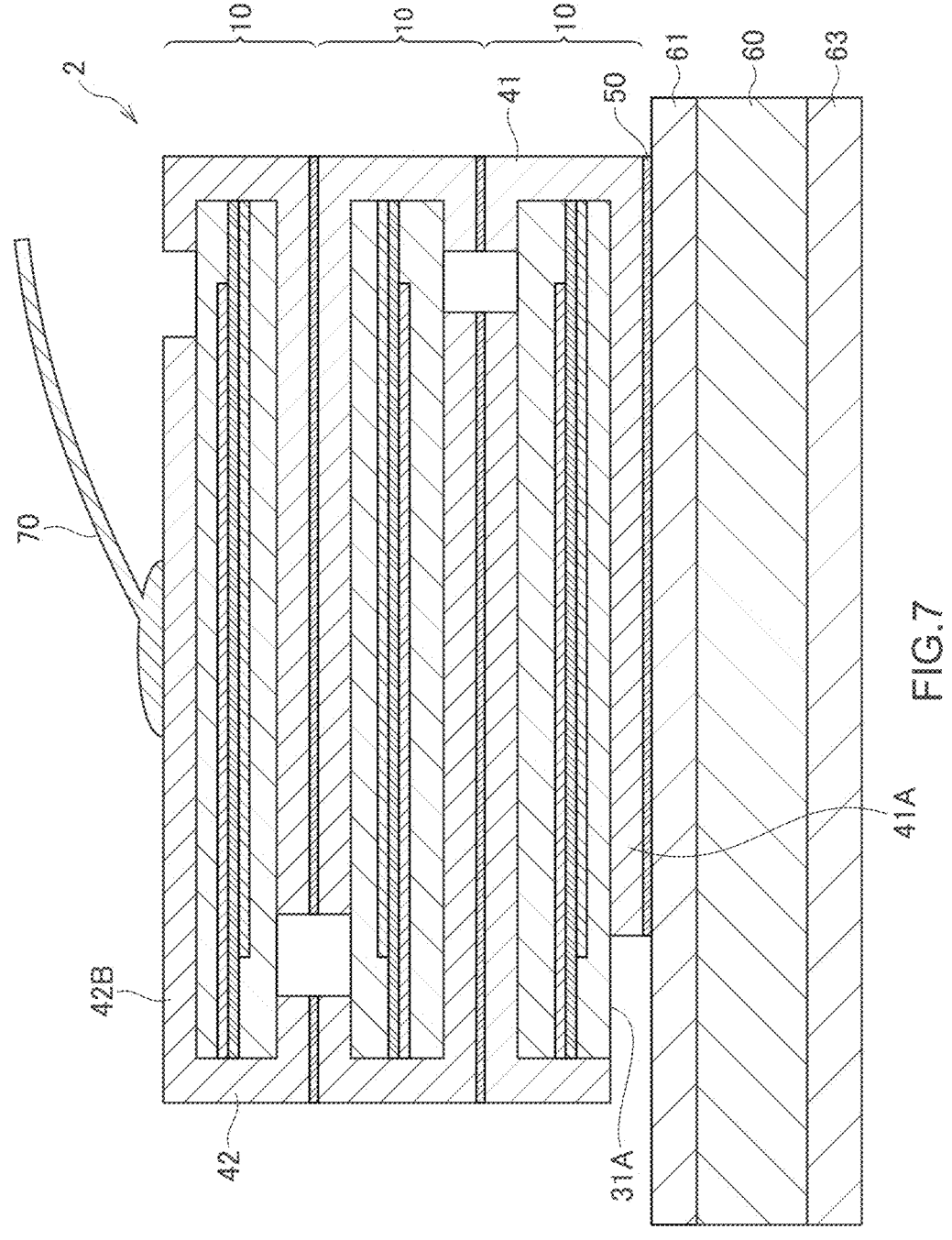
FIG. 7 is a schematic cross-sectional view illustrating a state where the thin film capacitor 2 is mounted on the DBC substrate.

FIG. 7 is a schematic cross-sectional view illustrating a state where the thin film capacitor 2 is mounted on the DBC substrate.

The DBC substrate illustrated in FIG. 7 has a structure in which the copper patterns 61 and 63 are formed respectively on front and back surfaces of the substrate 60. The first section 41A of the terminal electrode 41 of the lowermost one of the plurality of unit capacitors 10 constituting the thin film capacitor 2 is connected to the copper pattern 61 through the solder 50. On the other hand, in the lowermost one of the plurality of unit capacitors 10 constituting the thin film capacitor 1, the fourth section 42A of the terminal electrode 42 is removed, thereby ensuring insulation with respect to the copper pattern 61. Further, the fifth section 42B of the terminal electrode 42 of the uppermost one of the plurality of unit capacitors 10 constituting the thin film capacitor 2 is connected to a bonding wire 70. Thus, the copper pattern 61 is connected in common to the capacitor electrodes 21 included in the plurality of unit capacitors 10, and the bonding wire 70 is connected in common to the capacitor electrodes 22 included in the plurality of unit capacitors 10.

While the preferred embodiment of the present disclosure has been described, the present disclosure is not limited to the above embodiment, and various modifications may be made within the scope of the present disclosure, and all such modifications are included in the present disclosure.

REFERENCE SIGNS LIST

1, 2 thin film capacitor
10 unit capacitor
20 dielectric layer
21, 22 capacitor electrode
31, 32 protective insulating film
31A upper surface of the protective insulating film
41, 42 terminal electrode
41A first section
41B second section
41C third section
42A fourth section
42B fifth section
42C sixth section
50 solder
60 substrate
61-63 copper pattern
70 bonding wire
E1, E2 edge
G gap
S1, S2 side surface

The invention claimed is:

1. A thin film capacitor comprising:
a dielectric layer having a first surface and a second surface positioned on an opposite side of the first surface;
a first capacitor electrode formed on the first surface of the dielectric layer;
a second capacitor electrode formed on the second surface of the dielectric layer;
a first protective insulating film formed on the first surface of the dielectric layer so as to embed therein the first capacitor electrode;
a second protective insulating film formed on the second surface of the dielectric layer so as to embed therein the second capacitor electrode;
a first terminal electrode electrically connected to the first capacitor electrode; and a second terminal electrode electrically connected to the second capacitor electrode,
wherein the first terminal electrode includes a first section positioned on the first protective insulating film so as to overlap the first capacitor electrode, a second section positioned on the second protective insulating film so as not to overlap the second capacitor electrode, and a third section connecting the first and second sections, and
wherein the first section of the first terminal electrode is larger than the second section of the first terminal electrode.

2. The thin film capacitor as claimed in claim 1,
wherein the first capacitor electrode is exposed from a first side surface of a stacked body including the dielectric layer, first and second capacitor electrodes, and first and second protective insulating films, and
wherein the third section is positioned on the first side surface.

3. The thin film capacitor as claimed in claim 2, wherein the second terminal electrode includes a fourth section positioned on the first protective insulating film so as not to overlap the first capacitor electrode, a fifth section positioned on the second protective insulating film so as to overlap the second capacitor electrode, and a sixth section connecting the fourth and fifth sections.

4. The thin film capacitor as claimed in claim 3,
wherein the second capacitor electrode is exposed from a second side surface of the stacked body, and
wherein the sixth section is positioned on the second side surface.

5. The thin film capacitor as claimed in claim 3, wherein the fifth section of the second terminal electrode is larger than the fourth section of the second terminal electrode.

6. The thin film capacitor as claimed in claim 5, wherein the fifth section of the second terminal electrode partially overlaps the first capacitor electrode.

7. The thin film capacitor as claimed in claim 1, wherein the first section of the first terminal electrode partially overlaps the second capacitor electrode.

8. A thin film capacitor including first and second unit capacitors,
wherein each of the first and second unit capacitors comprises:
a dielectric layer having a first surface and a second surface positioned on an opposite side of the first surface;
a first capacitor electrode formed on the first surface of the dielectric layer;
a second capacitor electrode formed on the second surface of the dielectric layer;
a first protective insulating film formed on the first surface of the dielectric layer so as to embed therein the first capacitor electrode;
a second protective insulating film formed on the second surface of the dielectric layer so as to embed therein the second capacitor electrode;
a first terminal electrode electrically connected to the first capacitor electrode; and
a second terminal electrode electrically connected to the second capacitor electrode,
wherein the first terminal electrode includes a first section positioned on the first protective insulating film so as to overlap the first capacitor electrode, a second section positioned on the second protective insulating film so as not to overlap the second capacitor electrode, and a third section connecting the first and second sections, and wherein the first and second unit capacitors are stacked such that the first section of the first terminal electrode included in the first unit capacitor and the first section of the first terminal electrode included in the second unit capacitor are connected to each other and that the first protective insulating film in the first unit capacitor and the first protective insulating film in the second unit capacitor face each other.

9. The thin film capacitor as claimed in claim 8, wherein the second terminal electrode includes a fourth section positioned on the first protective insulating film so as not to overlap the first capacitor electrode, a fifth section positioned on the second protective insulating film so as to overlap the second capacitor electrode, and a sixth section connecting the fourth and fifth sections, and wherein the first and second unit capacitors are stacked such that the fourth section of the second terminal electrode included in the first capacitor electrode and the fourth section of the second terminal electrode included in the second capacitor electrode are connected to each other.

10. The thin film capacitor as claimed in claim 9, further including a third unit capacitor having a same configuration as those of the first and second unit capacitors, wherein the first, second, and third unit capacitors are stacked such that the second section of the first terminal electrode included in the second unit capacitor and the second section of the first terminal electrode included in the third unit capacitor are connected to each other and that the fifth section of the second terminal electrode included in the second unit capacitor and the fifth section of the second terminal electrode included in the third unit capacitor are connected to each other.

11. The thin film capacitor as claimed in claim 10, wherein the first, second, and third unit capacitors are stacked such that the second protective insulating film in the second unit capacitor and the second protective insulating film in the third unit capacitor face each other.

12. The thin film capacitor as claimed in claim 9, further comprising a solder provided between the fourth section of the second terminal electrode included in the first capacitor electrode and the fourth section of the second terminal electrode included in the second capacitor electrode.

13. The thin film capacitor as claimed in claim 9, wherein the fifth section of the second terminal electrode is larger than the fourth section of the second terminal electrode.

14. The thin film capacitor as claimed in claim 8, further comprising a solder provided between the first terminal electrode included in the first unit capacitor and the first section of the first terminal electrode included in the second unit capacitor.

15. The thin film capacitor as claimed in claim 8, wherein the first section of the first terminal electrode is larger than the second section of the first terminal electrode.

16. A thin film capacitor comprising:

a dielectric layer having a first surface and a second surface positioned on an opposite side of the first surface;

a first capacitor electrode formed on the first surface of the dielectric layer;

a second capacitor electrode formed on the second surface of the dielectric layer;

a first protective insulating film formed on the first surface of the dielectric layer so as to embed therein the first capacitor electrode;

a second protective insulating film formed on the second surface of the dielectric layer so as to embed therein the second capacitor electrode;

a first terminal electrode electrically connected to the first capacitor electrode; and a second terminal electrode electrically connected to the second capacitor electrode, wherein the first terminal electrode includes a first section positioned on the first protective insulating film so as to overlap the first capacitor electrode, a second section positioned on the second protective insulating film so as not to overlap the second capacitor electrode, and a third section connecting the first and second sections, and wherein the first section of the first terminal electrode includes a first sub-section overlapping the first capacitor electrode without overlapping the second capacitor electrode and a second sub-section overlapping the first and second capacitor electrodes.

17. The thin film capacitor as claimed in claim 16, wherein the second terminal electrode includes a fourth section positioned on the first protective insulating film so as not to overlap the first capacitor electrode, a fifth section positioned on the second protective insulating film so as to overlap the second capacitor electrode, and a sixth section connecting the fourth and fifth sections, and wherein the fifth section of the second terminal electrode includes a third sub-section overlapping the second capacitor electrode without overlapping the first capacitor electrode and a fourth sub-section overlapping the first and second capacitor electrodes.

18. The thin film capacitor as claimed in claim 17, wherein the second sub-section of the first section of the first terminal electrode partially overlaps the fourth sub-section of the fifth section of the second terminal electrode.

19. The thin film capacitor as claimed in claim 16, wherein the first section of the first terminal electrode is larger than the second section of the first terminal electrode.

* * * * *